United States Patent [19]

Break

[11] Patent Number: 4,784,554

[45] Date of Patent: Nov. 15, 1988

[54] T-BOLT ASSEMBLY

[76] Inventor: Douglas G. Break, Independence Green Apts., 24654 Madison Ct., Apt. 241, Farmington Hills, Mich. 48024

[21] Appl. No.: 780,594

[22] Filed: Sep. 26, 1985

[51] Int. Cl.⁴ .................. F16B 35/02; F16D 1/00
[52] U.S. Cl. .................. 411/383; 411/85; 411/401; 403/341
[58] Field of Search .......... 411/383, 384, 400, 401, 411/389, 397, 410, 84, 85; 403/298, 341

[56] References Cited

U.S. PATENT DOCUMENTS

| 105,235 | 7/1870 | Odell | 403/341 |
|---|---|---|---|
| 793,690 | 7/1905 | Snyder | 403/341 |
| 1,161,406 | 11/1915 | Nilson. | |
| 3,298,273 | 1/1967 | McKelvey. | |
| 3,346,114 | 10/1967 | Hoyt | 411/401 |
| 4,022,099 | 5/1977 | Ballantyne | 411/383 |
| 4,290,337 | 9/1981 | Kuwata et al. . | |
| 4,309,140 | 1/1982 | Steffer et al. . | |

FOREIGN PATENT DOCUMENTS

| 3035119 | 4/1982 | Fed. Rep. of Germany | 411/383 |
|---|---|---|---|
| 1456555 | 9/1966 | France | 411/383 |
| 2066401 | 1/1981 | United Kingdom | 411/383 |

Primary Examiner—Neill Wilson
Attorney, Agent, or Firm—Gifford, Groh, VanOphem, Sheridan, Sprinkle and Dolgorukov

[57] ABSTRACT

A T-bolt assembly having a first elongated stud with a cross bar at one end adapted to be positioned within the T-slot of a machine table and externally threaded at its other end. A second elongated stud is externally threaded at both ends while an internally threaded collar threadably engages the external threads on the first stud and one end of the second stud when the studs are axially aligned and adjacent each other. A non circular projection extends axially outwardly from one end of one stud and is received within a like shaped recess on the end of the other stud to prevent the studs from rotation relative to each other.

4 Claims, 1 Drawing Sheet

T-BOLT ASSEMBLY

BACKGROUND OF THE INVENTION

I. Field of the Invention

The present invention relates generally to fasteners and, more particularly, to an extendable fastener for a machine table having at least one T slot.

II. Description of the Prior Art

There are many types of machine tables, such as those used with vertical mills, drill presses and the like, which have a work supporting surface on which the work is positioned. In addition, a plurality of inverted T shaped slots or T slots are formed in the table so that the leg or narrower portion of the slot is open to the work supporting surface. Conversely, the cross bar or wider portion of the T slot is positioned below the surface of the table.

In order to clamp the work to the table, it has been the previous practice to slide a T bolt in from one end of the slot on the table and to a position adjacent the work. These previously known T bolts are dimensioned so that, although the T bolt can longitudinally slide along the slot, they cannot rotate within the slot. Consequently, with the T bolt positioned adjacent the work, a clamp or other fastener is secured to the upwardly extending end of the T bolt by a nut or the like. Since the T bolt cannot rotate within the slot, the nut and clamp can be tightened as desired.

A problem arises, however, when a longer T bolt is required and is neither available or presently secured to the machine table. When this occurs, a T bolt extension is used to extend the effective length of the T bolt.

These previously known extensions typically comprise an elongated stud having external threads at at least one end. An internally threaded collar is threaded onto one end of the stud and is also threaded onto the threaded end of the T bolt and the collar is tightened against the T-bolt. In doing so, the effective length of the T bolt is increased.

One disadvantage of these previously known T bolt extensions is that the collar often becomes loosened when the nut used to clamp the workpiece is loosened by the machine operator. When this occurs, the extension for the T bolt assembly must be reassembled before the clamp can be used on another workpiece.

One previous solution to this problem is to provide flats on the extension stud which is engaged by a wrench held by the operator while the nut on the T bolt is loosened. This previously known practice, however, is not only time consuming and oftentimes difficult to achieve, but also in many cases the flats cannot be reached by a wrench.

SUMMARY OF THE PRESENT INVENTION

The present invention provides a T bolt assembly which overcomes all of the above mentioned disadvantages of the previously known devices.

In brief, the T bolt assembly of the present invention comprises a first elongated stud having external threads of a first end and a cross bar at its second end. This cross bar is adapted to be positioned within a T slot of a machine table.

A second elongated stud has external threads at both its first and second ends. The first ends of both studs are positioned so that they are axially adjacent and aligned with each other. An internally threaded collar then threadably engages the external threads on the first ends of both studs thereby securing the studs together in axial alignment with each other.

In order to prevent relative rotation between the first and second studs as would otherwise occur when the nut on the T bolt assembly is loosened, one of the studs include a projection having a non circular cross sectional shape which extends axially outwardly from its first end. This projection is received within an axially extending recess having the same cross sectional shape as the projection. Thus, with the projection positioned within its receiving recess, the studs are locked together against rotation relative to each other.

The projection as well as its receiving recess can have any non circular cross sectional shape. However, the cross sectional shape of the recess and projection is preferably square or hexagonal.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
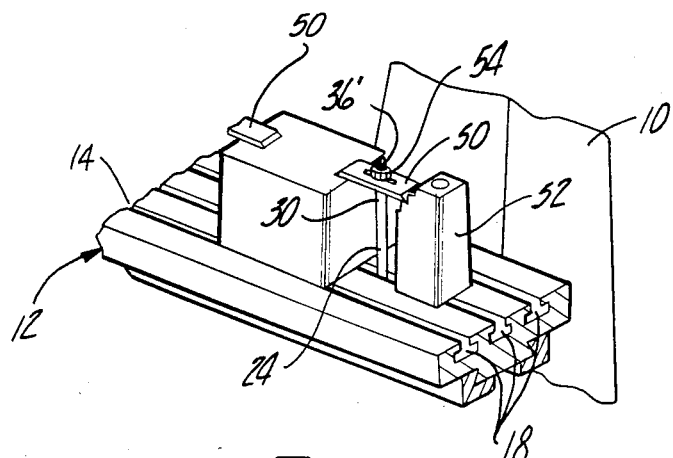
FIG. 1 is a fragmentary perspective view illustrating the present invention utilized with a work table.

With reference first to FIG. 1, a machine 10 is thereshown having a work table 12 with an upper surface 14. A work 16 is supported on the surface 14 and is attached to the surface 14 by a plurality of clamping members 20 in a fashion which will be subsequently described. With the work 16 clamped to the top surface 14 of the machine table, a machining operation, such as milling, drilling or the like, is then performed on the work 16.

Figure 2:
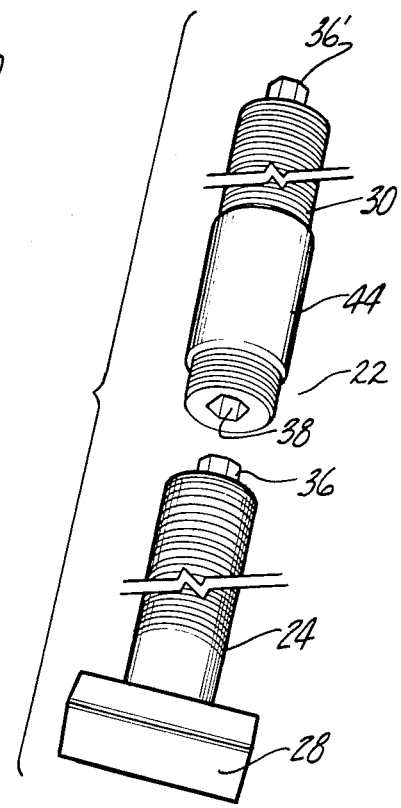
FIG. 2 is an exploded elevational view illustrating a preferred embodiment of the present invention.
Figure 3:
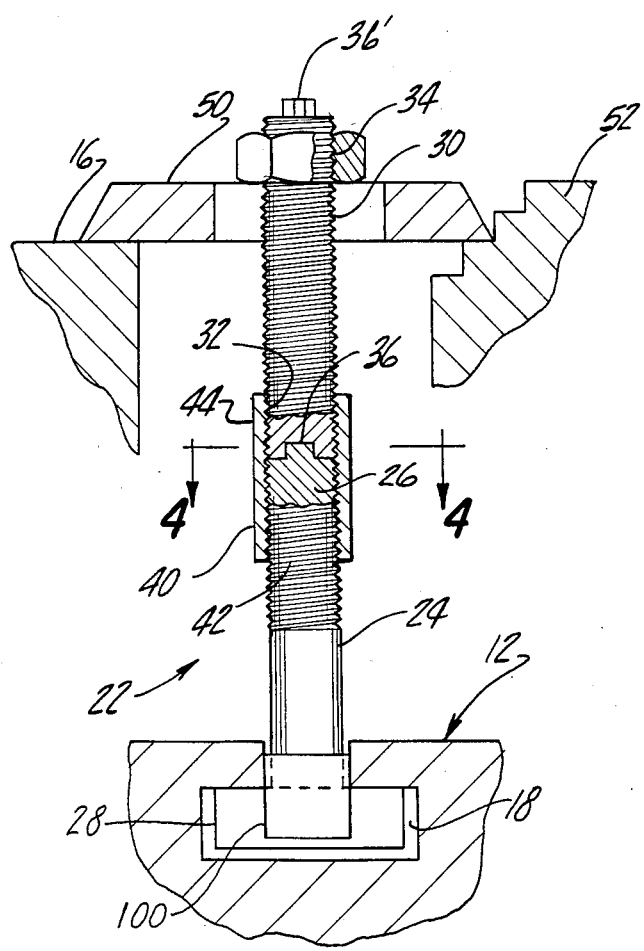
FIG. 3 is a longitudinal sectional view of the preferred embodiment of the present invention.

With reference now to FIGS. 2 and 3, a preferred embodiment of the T bolt assembly 22 of the present invention is thereshown and comprises an elongated first stud 24 having external threads at a first end 26 and a cross bar 28 at its second end. The cross bar 28 is dimensioned to be received within a T slot 18 on the work table 12 and locked into position in any conventional manner. However, preferably, the means shown in my earlier U.S. Pat. No. 4,530,493, issued July 23, 1985 is employed to lock the stud 24 in the T slot 18. That locking means comprises a U-shaped collar 100 (FIG. 3) which fits over the cross bar 28.

Still referring to FIGS. 2 and 3, the assembly 22 further comprises a second elongated stud 30 having external threads at both a first end 32 and a second end 34. The second stud 30 is the same diameter as the first stud 24 and the threads at both ends 32 and 34 are of the same type as the external threads at the end 26 of the first stud 24.

Figure 4:
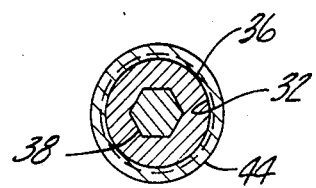
FIG. 4 is a cross sectional view taken substantially along line 4—4 in FIG. 3.

With reference now to FIGS. 2-4, a projection 36 having a non circular cross sectional shape extends axially outwardly from the end 26 of the first stud 24. Similarly, the second stud 30 has a cross sectional shape corresponding to the shape of the projection 36 so that the projection 36 is axially slidably received within the recess 38 as shown in FIG. 3. The projection 36 and its corresponding recess 38 may be of any desired non circular cross sectional shape such as hexagonal, as shown in the patent drawing, square or the like.

With reference now again to FIGS. 2 and 3, a cylindrical collar 40 has an internally threaded bore 42 which threadably cooperates with the externally threaded ends 36 and 32 of the studs 24 and 30, respectively. The collar 40 preferably has a non circular outer periphery 44, such as square or hexagonal, so that the collar 40 can be easily grasped and rotated by a user. In addition, the axial length of the collar 40, together with the axial length of the threads at the end 32 of the study 30 is dimensioned so that the collar 40 can be threaded entirely on the second stud 30 as shown in FIG. 2.

In operation, the cross bar 28 of the first study 24 is positioned within the T slot 18 in the conventional fashion. With the collar 40 threaded entirely onto the second stud 30 as shown in FIG. 2, the ends 26 and 32 of the studs 24 and 30, respectively, are positioned in axial alignment with each other and closely adjacent to each other so that the projection 36 is slidably positioned within the recess 38. The collar 40 is then screwed down onto the end 26 of the first stud 24 so that the collar 44 overlaps the junction of the studs 24 and 30 thereby securing the studs 24 and 30 together.

A conventional clamp 50 is then positioned over the upper end 34 of the second stud 30 so that one end of the clamp 50 abuts against the work 16 while its other end abuts against the conventional step block 52. Lastly, a nut 54 is used to secure the clamp 50 in place thereby securing the work 16 to the table 12.

The provision of the non circular projection 36 together with its receiving recess 38 prevents the studs 24 and 30 from rotating relative to each other as the nut 54 is tightened or loosened. Furthermore, the second stud 30 preferably includes an axially extending projection 36' at its free end 34 so that three or more studs can be secured together in axial alignment, if desired.

A primary advantage of Applicant's invention is the provision of the projection 36 and recess 38 which are integrally formed with the studs 24 and 30 and which, together with the collar 40 prevents the studs 24 and 30 from rotating relative to each other as the nut 54 is tightened or loosened. As such, the previously known necessity of holding the stud 30 against rotation by a wrench as the nut 54 is tightened or loosened is entirely eliminated.

A still further advantage of Applicant's invention is that it is not necessary to tighten the collar 40 on the studs 24 and 30 in order to secure the studs 24 and 30 together. Rather, the collar 40 need only be loosely screwed across the junction of the studs 24 and 30 which can be easily manually accomplished with one's fingers and without tools.

Having described my invention, however, many modifications thereto will become apparent to those skilled in the art to which it pertains without deviation from the spirit of the invention as defined by the scope of the appended claims.

I claim:

1. A T-bolt assembly comprising:
  a first elongated stud having an outer periphery and external threads at a first end along said outer periphery and a cross bar at a second end adapted to be positioned in a T slot of a machine table and means for preventing rotation of said first stud with respect to said table, said external threads on said first stud having a predetermined orientation,
  a second elongated stud having an outer periphery and external threads at a first and second end along said outer periphery, said external threads on said second stud having said predetermined orientation,
  an internally threaded collar adapted to threadably engage the external threads on said first end of said first stud and the external threads at said first end of said second stud, said collar having a portion disposed radially outwardly from the respective outer peripheries of said first and second studs, wherein said collar locks said first and second studs against longitudinal movement with respect to each other whenever the collar threads threadably engage said threads on said studs,
  means integrally formed at said first ends of said studs for preventing rotation of said studs relative to each other when said first ends of said studs are axially aligned and adjacent each other, said means comprising an axial projection on the first end of one stud which is axially freely slidably received in a like shaped recess of the first end of the other stud, said projection and said recess having a noncircular crossectional shape.

2. The invention as defined in claim 1 wherein said cross sectional shape is hexagonal.

3. The invention as defined in claim 1 wherein said second stud comprises an axially extending projection having said cross sectional shape at said second end of said second stud.

4. The invention as defined in claim 1 wherein said projection is formed on said first stud and said recess is formed on said second stud.

* * * * *